United States Patent
Hasman (10) Patent No.: US 8,045,830 B2
(45) Date of Patent: Oct. 25, 2011

(54) APPARATUS AND METHOD FOR EXCITATION OF A SINGLE MODE IN A WAVEGUIDE

(75) Inventor: Erez Hasman, Hadera (IL)

(73) Assignee: Technion Research and Development Foundation Ltd., Haifa (IL)

( * ) Notice: Subject to any disclaimer, the term of this patent is extended or adjusted under 35 U.S.C. 154(b) by 223 days.

(21) Appl. No.: 12/438,754

(22) PCT Filed: Aug. 28, 2007

(86) PCT No.: PCT/IL2007/001063
§ 371 (c)(1),
(2), (4) Date: Feb. 25, 2009

(87) PCT Pub. No.: WO2008/026206
PCT Pub. Date: Mar. 6, 2008

(65) Prior Publication Data
US 2010/0002993 A1     Jan. 7, 2010

Related U.S. Application Data

(60) Provisional application No. 60/840,949, filed on Aug. 30, 2006.

(51) Int. Cl.
*G02F 1/01*     (2006.01)
*G02B 6/26*     (2006.01)
(52) U.S. Cl. .............................. 385/28; 385/1; 385/38
(58) Field of Classification Search ..................... 385/28
See application file for complete search history.

(56) References Cited

U.S. PATENT DOCUMENTS

| 5,061,037 A | 10/1991 | Wong et al. |
| 2004/0258353 A1 | 12/2004 | Gluckstad et al. |

OTHER PUBLICATIONS

Johnson, S. et al, "Low-Loss Asymptotically Single-Mode Propagation in Large-Core OmniGuide Fibers", Optics Express, 2001, pp. 748-779, vol. 9, No. 13, Optical Society of America, USA.

Temelkuran, B. et al, "Wavelength-Scalable Hollow Optical Fibers with Large Photonic Bandgaps for $CO_2$ Laser Transmission", Nature, 2002, pp. 650-653, vol. 420, Nature Publishing Group.

Hasman, E. et al, "Space-Variant Polarization Manipulation," Progress in Optics, 2005, pp. 215-289, vol. 47, E.Wolf ed., Elsevier, Netherlands, Amsterdam.

Niv, A. et al, "Propagation-Invariant Vectorial Bessel Beams Obtained By Use of Quantized Pancharatnam-Berry Phase Optical Elements", Optics Letters, 2004, pp. 238-240, vol. 29, No. 3, Optical Society of America, USA.

Niv, A. et al, "Rotating Vectorial Vortices Produced by Space-Variant Subwavelength Gratings", Optics Letters, 2005, pp. 2933-2935, vol. 30, No. 21, Optical Society of America, USA.

(Continued)

*Primary Examiner* — Jerry T Rahll
(74) *Attorney, Agent, or Firm* — Pearl Cohen Zedek Latzer LLP (57) ABSTRACT

A wave-guiding system and method for mode-selective transmission of a spatially coherent light beam is disclosed. The system comprises a wave-guide with an inlet and an outlet for transmitting one or more modes; a first mode-shaping optical element for shaping the spatially coherent light beam before it enters through the inlet of the wave-guide to a desired mode of the wave-guide; and a second mode-shaping optical element for shaping light beam after it exits from the outlet of the wave-guide for obtaining a desired vectorial field.

16 Claims, 4 Drawing Sheets

OTHER PUBLICATIONS

Mohammed, W.S. et al, "Selective Excitation of the $TE_{01}$ Mode in Hollow-Glass Waveguide Using a Subwavelength Grating", IEEE Photonics Technology Letters, 2005, pp. 1441-1443, vol. 17, No. 7, IEEE.

Yirmiyahu, Y. et al, "Vectorial Vortex Mode Transformation For a Hollow Waveguide Using Pancharatriam-Berry Phase Optical Elements," Optics Letters, 2006, pp. 3252-3254, vol. 31, No. 22, Optical Society of America, USA.

International Search Report for International Application No. PCT/IL2007/001063 mailed Jul. 18, 2008.

APPARATUS AND METHOD FOR EXCITATION OF A SINGLE MODE IN A WAVEGUIDE

CROSS-REFERENCE TO RELATED APPLICATIONS

This application is a National Phase Application of PCT International Application No. PCT/IL2007/001063, International Filing Date Aug. 28, 2007, claiming priority of U.S. Patent Application 60/840,949, filed Aug. 30, 2006, both of which are incorporated herein by reference in their entirety.

FIELD OF THE INVENTION

The present invention relates to optical waveguides. More particularly the present invention relates to apparatus and method for excitation of a single mode in a waveguide.

BACKGROUND OF THE INVENTION

Hollow waveguides present an alternative to solid core fibers at the infra-red (IR) regime where suitable optical materials are scarce. In addition, due to their air core, they can be used for broad-spectrum high power transmission as they suffer from small insertion losses. As a result, hollow waveguides are used in industrial and medical applications involving $CO_2$ and Er:YAG lasers as well as for spectroscopic and radiometric measurements. In 1897, Lord Rayleigh was the first to consider using hollow metallic waveguides for the propagation of electromagnetic radiation. However, he considered the metal to be a perfect conductor, thus his solution is inadequate in optical regimes where metal behaves more like a lossy dielectric. In 1961, Snitzer presented a general treatment for the propagation of electromagnetic fields inside cylindrical waveguides of arbitrary material. A convenient approximation for circular metallic waveguides was later presented by Marcatili and Schmeltzer in 1964. In 1984, Kawakami and Miyagi proposed an improved design in which an additional inner dielectric multilayer stack is used to reduce transmission losses. Recently, a new design for a circular hollow Bragg waveguide, which is a type of photonic band gap fiber, has been presented [S. Johnson, M. Ibanescu, M. Skorobogatiy, O. Weisberg, T. Engeness, M. Soljacic, S. Jacobs, J. Joannopoulos, and Y. Fink, "Low-loss asymptotically single-mode propagation in large-core OmniGuide fibers," Opt. Express 9, 748-779 (2001), and B. Temelkuran, S. D. Hart, G. Benoit, J. D. Joannopoulos, Y. Fink, "Wavelength-scalable hollow optical fibres with large photonic bandgaps for $CO_2$ laser transmission", Nature 420, 650 (2002)]. In this case, guiding is obtained by reflection from a periodic dielectric layers rather than by metal cladding. Therefore, the waveguide performance is no longer limited by the metallic losses.

A hollow waveguide supports vectorial modes in a manner determined by its structure and material composition. It is customary to classify the modes: transverse electric-$TE_{0m}$, transverse magnetic-$TM_{0m}$, and hybrid-$HE_{nm}$, and $EH_{nm}$- modes. The integers n, m>0 denote the azimuthal and radial mode orders. The commonly used modes of circular hollow waveguides are the $TE_{01}$ and $HE_{11}$; The $TE_{01}$ is an azimuthal linearly polarized vectorial vortex having a dark central core. This mode possesses the least amount of loss in a bare circular metallic hollow waveguide as well as in the circular hollow Bragg waveguide; The $HE_{11}$ mode is linearly polarized and has a bright central core. It is the lowest order mode in terms of waveguide cutoff. It is important to note that a general hollow waveguide mode has a spatially varying polarization state, with the exception of the linearly polarized $HE_{1m}$ set of modes.

While current applications of hollow waveguides, such as power delivery, rely on multimode operation, future applications might benefit from the ability to excite only a single waveguide mode. Such applications include hollow waveguide lasers and single $TE_{01}$ mode circular Bragg waveguides. We expect that additional applications of hollow waveguides might emerge once higher order modes are exploited. For example, the mode's dark core increment with azimuthal mode order n might prove useful for blue detuned atom guiding. Also higher order modes can be used for dispersion compensation.

Coupling a single hollow waveguide mode requires matching the phase, amplitude, and polarization state. Phase and amplitude matching methods are well developed and can be achieved by conventional optical devices, irregular waveguides, and diffractive or holographic optics. However, matching the polarization state is more challenging. Several techniques for this purpose exist such as liquid crystal spatial light modulators, interferometric techniques, and lasers with intra-cavity optical devices. However, all these methods are either cumbersome, have low power thresholds or inadequate in the IR regime.

Recently, we have demonstrated spatial polarization state manipulation by space-variant subwavelength gratings [E. Hasman, G. Biener, A. Niv, and V. Kleiner, "Space-variant polarization manipulation," in Progress in Optics, vol. 47, E. Wolf ed. (Elsevier, Netherlands, Amsterdam, 2005)]. These devices act as waveplates with space-variant orientations and as inhomogeneous anisotropic subwavelength structures, they are particularly well suited for polarization manipulation. As the optical properties of these devices stem from the geometric Pancharatnam-Berry phase, they are called Pancharatnam-Berry phase optical elements (PBOEs). PBOEs are both compact and efficient optical devices. They were used for the formation of propagation invariant vectorial Bessel beams [A. Niv, G. Biener, V. Kleiner, and E. Hasman, "Propagation-invariant vectorial Bessel beams obtained by use of quantized Pancharatnam-Berry phase optical elements," Opt. Lett. 29, 238-240], rotating vectorial vortices [A. Niv, G. Biener, V. Kleiner, and E. Hasman, "Rotating vectorial vortices produced by space-variant subwavelength gratings," Opt. Lett. 30, 2933-2935 (2005)], and for the excitation of a vectorial hollow waveguide mode in the 1.55 µm wavelength regime [W. S. Mohammed, A. Mehta, M. Pitchumani, and E. G. Johnson, "Selective excitation of the $TE_{01}$ mode in hollow-glass waveguide using a subwavelength grating", Photon. Technol. Lett. 17, 1441 (2005)]. Furthermore, we have presented the use of PBOEs for the coupling and inverse coupling of free-space linearly polarized beams to a hollow waveguide's azimuthally polarized vectorial $TE_{02}$ mode [Y. Yirmiyahu, A. Niv, G. Biener, V. Kleiner, and E. Hasman, "Vectorial vortex mode transformation for a hollow waveguide using Pancharatnam-Berry phase optical elements," Opt. Lett. 31, 3252-3254 (2006)].

It is a purpose of the present invention to provide a general approach for coupling free space beams to any of the hollow waveguide modes, thus enabling single mode operation.

SUMMARY OF THE INVENTION

There is thus provided, in accordance with some preferred embodiments of the present invention, a wave-guiding system for mode-selective transmission of a spatially coherent light beam, the system comprising:

a wave-guide with an inlet and an outlet for transmitting one or more modes;

a first mode-shaping optical element for shaping the spatially coherent light beam before it enters through the inlet of the wave-guide to a desired mode of the wave-guide; and a second mode-shaping optical element for shaping light beam after it exits from the outlet of the wave-guide for obtaining a desired vectorial field.

Furthermore, in accordance with some preferred embodiments of the present invention, the wave-guide comprises an optical fiber.

Furthermore, in accordance with some preferred embodiments of the present invention, the optical fiber comprises a hollow fiber.

Furthermore, in accordance with some preferred embodiments of the present invention, the optical fiber comprises a photonic band gap fiber.

Furthermore, in accordance with some preferred embodiments of the present invention, the photonic band gap fiber comprises a circular hollow Bragg wave-guide.

Furthermore, in accordance with some preferred embodiments of the present invention, the first mode-shaping optical element comprises a PBOE.

Furthermore, in accordance with some preferred embodiments of the present invention, the second mode-shaping optical element comprises a PBOE.

Furthermore, in accordance with some preferred embodiments of the present invention, the first and second mode-shaping optical elements comprise each a PBOE.

Furthermore, in accordance with some preferred embodiments of the present invention, the system further comprises additional optical elements placed on an optical path of the system.

Furthermore, in accordance with some preferred embodiments of the present invention, the additional optical elements comprise lenses.

Furthermore, in accordance with some preferred embodiments of the present invention, the system further comprises a spatially coherent light source for generating the spatially coherent light beam.

Furthermore, in accordance with some preferred embodiments of the present invention, first mode-shaping optical element comprises an optical element that causes the light beam to be a light beam with azimuthal polarization state.

Furthermore, in accordance with some preferred embodiments of the present invention, there is provided a method for mode-selective transmission of a spatially coherent light beam, the method comprising:

mode-shaping the spatially coherent light beam to a desired mode of a wave-guide;

passing the light-beam with the desired mode through the wave-guide; and mode-shaping the light beam after it exits from the wave-guide for obtaining a desired vectorial field.

Furthermore, in accordance with some preferred embodiments of the present invention, the step of mode-shaping the spatially coherent light beam to a desired mode of a wave-guide comprises passing the light beam through a PBOE.

Furthermore, in accordance with some preferred embodiments of the present invention, the step of mode-shaping the light beam after it exits from the wave-guide comprises passing the light beam through a PBOE.

Furthermore, in accordance with some preferred embodiments of the present invention, the step of mode-shaping the spatially coherent light beam to a desired mode of a wave-guide comprises passing the light beam through a PBOE, and the step of mode-shaping the light beam after it exits from the wave-guide comprises passing the light beam through a PBOE.

Furthermore, in accordance with some preferred embodiments of the present invention, the step of mode-shaping the spatially coherent light beam to a desired mode of a wave-guide comprises polarizing the beam to an azimuthal polarization state.

Furthermore, in accordance with some preferred embodiments of the present invention, the step of mode-shaping the light beam after it exits from the wave-guide comprises polarizing the beam to a linear polarization state.

Furthermore, in accordance with some preferred embodiments of the present invention, the step of mode-shaping the light beam after it exits from the wave-guide comprises polarizing the beam to a radial polarization state.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

Hollow waveguides possess a discrete set of propagating modes labeled by their radial and angular indexes m, n. The general structure of these modes is well known. The mode's field distribution as well as propagation constant, loss, and dispersion can be found by solving a transcendental characteristic equation. We consider a waveguide with a core diameter much larger than the wavelength used, so that only the transverse electric part of the mode is treated. For the fundamental azimuthal dependence of n=0, this waveguide's modes split into separate sets: the transverse electric (TE) and transverse magnetic (TM). The TE modes are azimuthally polarized according to, $$|E_{\phi,0m}\rangle = J_1(u_{0m}r/a)|\phi\rangle, \tag{1}$$

while the $TM_{0m}$ modes are radial, $$|E_{r,0m}\rangle = -J_1(u_{0m}r/a)|r\rangle. \tag{2}$$

In the case n≠0, this type of waveguide supports $EH_{nm}$ and $HE_{nm}$ set of modes with a transverse electric field given by, $$|E_{nm}\rangle = J_{n\mp 1}(u_{nm}r/a)[\pm\cos(n\phi+\phi_0)|r\rangle - \sin(n\phi+\phi_0)|\phi\rangle], \quad (3)$$

where upper or lower signs indicate either the $HE_{nm}$ or $EH_{nm}$ set of modes, respectively. Here, $|r\rangle = [\exp(i\phi)|R\rangle + \exp(-i\phi)|L\rangle]/\sqrt{2}$ and $|\phi\rangle = i[\exp(i\phi)|R\rangle - \exp(-i\phi)|L\rangle]/\sqrt{2}$ stands for radial and azimuthal polarizations with $|R\rangle = (1,-i)/\sqrt{2}$ and $|L\rangle = (1,i)^T/\sqrt{2}$ as right- and left-handed circular polarizations. Additionally, r and φ are the radius and azimuth polar coordinates in the transverse plane of the waveguide, a is the waveguide's air core radius, $u_{nm}/a$ is a complex transverse phase constant, and $J_l(x)$ is the first-kind Bessel function of order l.

When the period of a dielectric grating is sufficiently smaller than the wavelength of the impinging beam, the grating behaves as a uniaxial crystal with optical axes parallel and perpendicular to the grating strips. Therefore, by controlling ☐ the local orientation of the dielectric subwavelength grating waveplates with a space-varying fast axis are achieved. This enables formation of beams with almost arbitrary space-variant polarization states. We have previously shown that for linearly polarized illumination, the beam that emerges from a π retardation PBOE is given by, $$|E_{out,n}\rangle = \cos(2\theta-\phi)|r\rangle + \sin(2\theta-\phi)|\phi\rangle. \quad (4)$$

Comparing this result to the waveguide's modes in Eqs. (1), (2), and (3) we find that by setting the PBOE local groove orientation to be, $$\theta = \frac{1 \mp n}{2}\varphi + \frac{\varphi_0}{2}, \quad (5)$$

The polarization state of the waveguides modes is exactly reproduced. The upper '−' and lower '+' signs correspond to the $HE_{nm}$ and $EH_{nm}$ set of modes, respectively. It is important to note that in order to avoid limitations imposed by the continuous groove orientation, it is approximated by a piece-wise continuous orientation composed of constant orientated zones. We have shown that when 16 discrete zones are used, diffraction is negligible (more than 98% to the first diffraction order).

After having achieved the desired polarization state, in order to obtain an efficient coupling as well, the magnitude and phase distribution of the incident beam should also match those of the waveguide mode. We show that this can be achieved, to a satisfactory degree, by using a simple focusing lens. Immediately after the PBOE, the beam $|E_{out,n}\rangle$ has uniform intensity and the desired polarization state. By placing the PBOE at the front focal plane of a lens, we obtain at the back focal plane a field of the form, $$|E_{f,n}\rangle = A_n(r)|E_{out,n}\rangle, \quad (6)$$

where, $$A_n(r) = -\frac{i\lambda f}{2\pi r^2}\int_0^{\frac{2\pi R_0}{\lambda f}r} x J_{1\mp n}(x)dx. \quad (7)$$

Here, λ is the wavelength, $R_0$ is the aperture radius, f is the lens focal length, and the '−' and '+' signs correspond to TE/HE and TM/EH sets of modes, respectively. The field in Eqs. (6)-(7) represents concentric intensity rings that bear a close resemblance to the hollow waveguide modes. In order to evaluate the coupling efficiencies between this field and the waveguide mode we define a coupling coefficient according to, $$\eta_{nm} = \frac{|\langle E_{f,n}|E_{nm}\rangle|^2}{\langle E_{f,n}|E_{f,n}\rangle\langle E_{nm}|E_{nm}\rangle}. \quad (8)$$

For example, for the $TE_{0m}$ modes we obtain coupling efficiencies close to 1, 0.55, and 0.48 for $\pi a/(\lambda f_\#)$=5.4, 9,12, which corresponds to a radial mode order of m=1, 2, and 3, respectively. We also calculated coupling efficiencies close to unity (about 0.99) with $\pi a/(\lambda f_\#)$=3.7, 7, 8.4, 9.7 for the $HE_{11}$, $EH_{11}$, $EH_{21}$, and $EH_{31}$ modes, respectively. Therefore, it is possible to achieve high coupling coefficients for modes of radial order m=1 by choosing an appropriate focal length f.

Figure 1:
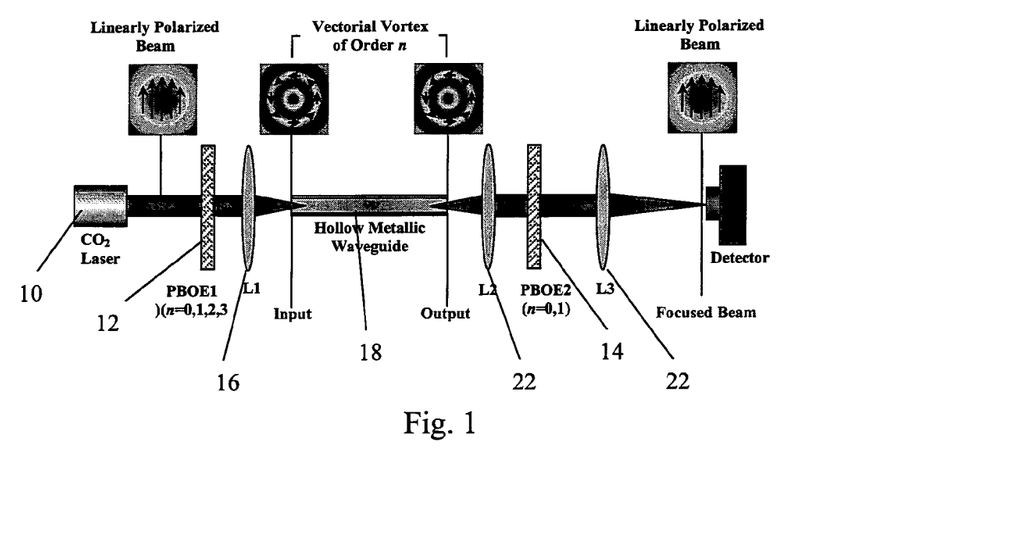
FIG. 1 shows a schematic presentation of our concept. A laser beam is coupled to a single waveguide mode by the subwavelength grating PBOE1 and the lens L1. Afterwards, the emerging beam is collimated and transformed into a free space mode using the lens L2 and PBOE2. The lens L3 is used for focusing the beam onto a two dimensional detector array.
Figure 2:
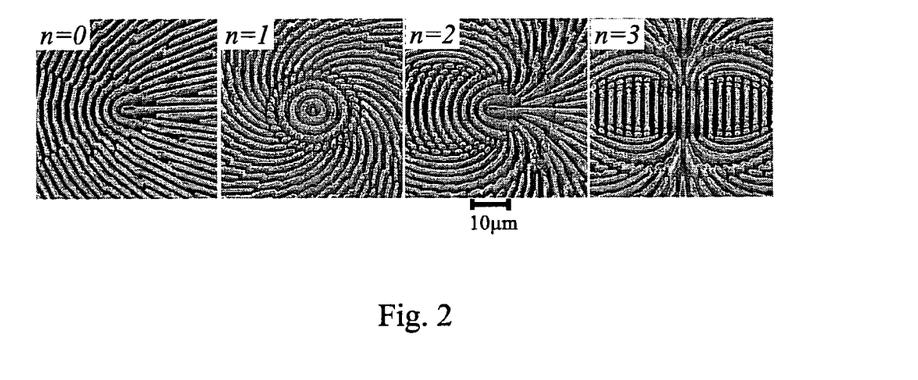
FIG. 2 shows scanning electron microscope images of several PBOEs used for coupling a linearly polarized 10.6 μm wavelength beam to hollow waveguide modes of different azimuthal order n.
Figure 3:
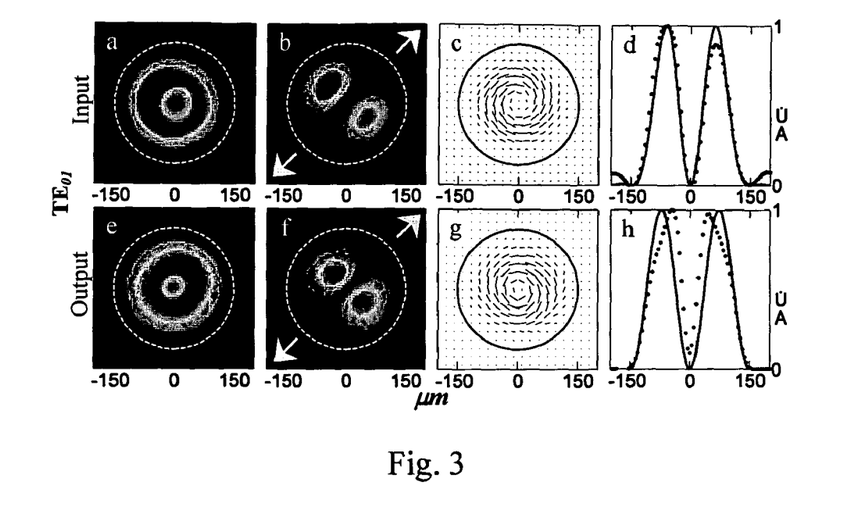
FIG. 3 shows measured results for exciting the $TE_{01}$ mode.
Figure 4:
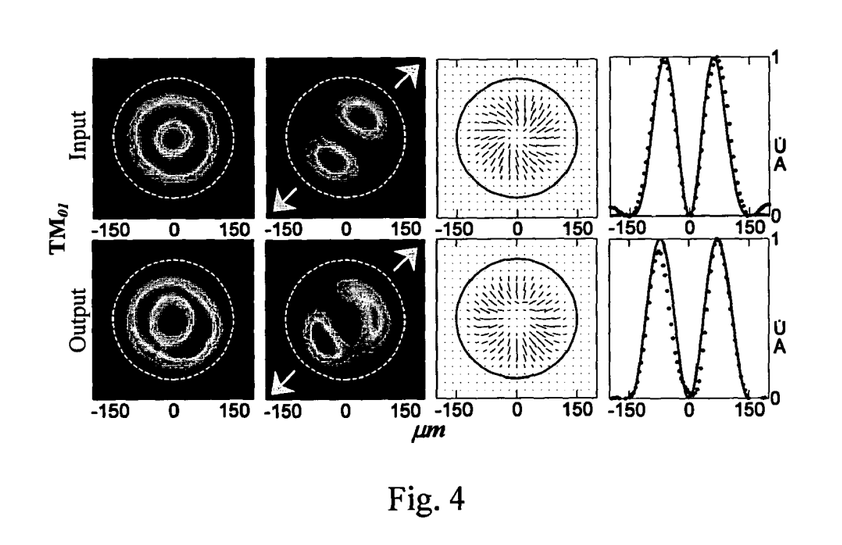
FIG. 4 shows measured results for exciting the $TM_{01}$ mode.
Figure 5:
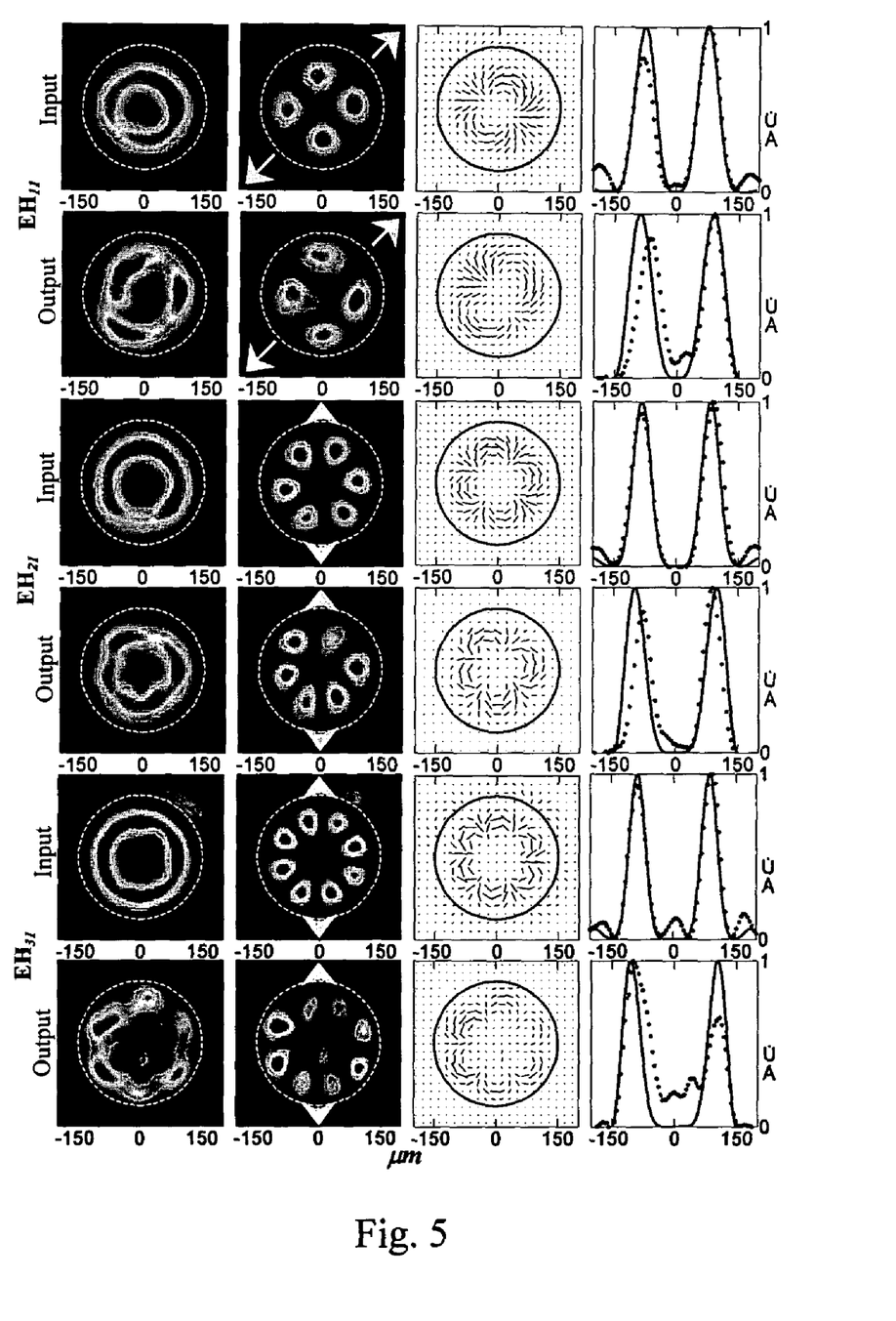
FIG. 5 shows the measured intensity and polarization at the fiber inlet and outlet for the $EH_{11}$, $EH_{21}$, and $EH_{31}$ modes.

In order to test our approach, we used the apparatus schematically depicted in FIG. 1. A 10.6 μm wavelength beam from a $CO_2$ laser source 10 illuminated PBOEs 12, 14 whose azimuthal order ranged from n=0 to 3. The PBOEs, 10 mm in diameter, were realized upon GaAs wafers and had a sub-wavelength period of Λ=2 μm, a fill factor of 0.5, and a nominal etching depth of 5 μm so as to achieve the desired π retardation. The desired groove orientation, given by Eq. (5), was approximated by 16 discrete zones for which we calculated diffraction efficiency greater than 98%. FIG. 2 shows scanning electron microscope images of several PBOEs used for coupling a linearly polarized 10.6 μm wavelength beam to hollow waveguide modes of different azimuthal order n. The discrete changes in the groove orientation as well as the high aspect ratio and rectangular shape of the grooves are clearly observed. The beam emerging from PBOE1 12, now having the correct polarization distribution, was focused onto the waveguide 18 inlet using lens L1 16. The lens aperture and the focal length were adjusted to obtain optimal coupling according to Eq. (8) and FIG. 3. We used a 61 cm commercially available Ag/AgI hollow silica waveguide with a 300 μm inner bore diameter (Polymicro HWCA300750). Finally, lenses L2 20 and L3 22 together with PBOE2 14 were used to modify the waveguide mode to either a diffraction limited focus spot, or a radially polarized vectorial vortex. We demonstrate our approach by measuring the full polarization state at the waveguide entrance and outlet ports. The results for excitation of different waveguide modes are shown in FIGS. 3-5 using the following template: The upper and lower rows relate to the waveguide's input and outlet ports, respectively. The first and second columns show false color images of the initial intensity and the intensity after a polarizer, respectively. The dashed line indicates the waveguides circumference while yellow arrows show the polarizer's orientation. The third column shows the measured local polarization ellipse's orientation. Finally, the fourth column shows a typical measured (dots) and predicted (solid line, from Eq. (7)) intensity cross-section.

Measured results for exciting the $TE_{01}$ mode are shown in FIG. 3. The power at the waveguide inlet was measured to be 170 mW. The doughnut-shaped intensity results from the vectorial vortex induced by the PBOE. The propeller-like intensity fringes after the polarizer indicate the existence of an azimuthally polarized vectorial vortex at the waveguide entrance. Measured intensity and polarization for coupling to the $TE_{01}$ mode at the waveguide's inlet (top) and outlet (bottom) ports. The first column depicts false color intensity representation with dashed line indicating the waveguide's inner circumference. The second column depicts false color representation of the intensity after a linear polarizer whose orientation is given by the yellow arrows. The third column shows the measured polarization ellipse's orientation, with bar length indicating intensity. The fourth column shows the measured (dots) and predicted (solid lines) intensity cross sections.

This result is supported by the polarization ellipse orientation whose typical deviation from the desired orientation, as calculated by Eq. (1), was 0.12 radians with a similar value for the mean ellipticity. Therefore, we obtained the required linearly polarized azimuthally oriented vectorial vortex at the waveguide entrance. In addition, the calculated and measured cross-sections indicate that the correct intensity profile was also achieved. At the waveguide's outlet, the single intensity ring and the evident propeller-like intensity behind the polarizer demonstrate a close resemblance to the $TE_{01}$ mode. The deviation of the polarization orientation from its desired value was 0.2 radians, with the ellipticity deviation less than 0.3 radians. Therefore, the field at the outlet port has the correct linear azimuthal n=0 polarization structure. Turning to the cross-section plot, a good agreement is found between the predicted and measured values, thereby verifying the required intensity profile of radial index m=1, and thus the existence of a single $TE_{01}$ mode. Comparing the measured equivalent losses (insertion+propagation) of 4.7 db/m at the waveguide outlet to the calculated 4.13 db/m $TE_{01}$ mode losses indicates the low insertion losses of our apparatus. Therefore, an efficient single mode excitation is demonstrated.

FIG. 4 demonstrates coupling of the $TM_{01}$ mode in much the same way as in FIG. 3. As can be seen from the measurements at the waveguide inlet, this mode differs from the $TE_{01}$ only by the local polarization orientation, namely radial instead of azimuthal. Consequently, it is coupled using an identical PBOE of order n=0, while either the PBOE or the incoming beam is rotated by a right angle. The intensity and polarization measurements performed at the waveguide's inlet and outlet indicate successful coupling of this mode. Measured intensity and polarization for coupling to the $TM_{01}$ mode at the waveguide's inlet (top) and outlet (bottom) ports. The first to fourth columns depict the intensity (dashed line indicates the waveguide inner circumference), intensity after a polarizer (arrows indicate polarizer orientation), measured polarization orientation, and intensity cross-section (dots-measured, solid line-predicted), respectively.

FIG. 5 shows the measured intensity and polarization at the fiber inlet and outlet for the $EH_{11}$, $EH_{21}$, and $EH_{31}$ modes. Good agreement of the results with the desired intensity distribution, polarization orientation, and cross-section indicates the ability to obtain a single high order excitation. The distortion of the high order modes at the waveguide inlet results from greater variation in the required polarization distribution. Further distortion at the waveguide outlet is attributed to the higher propagation losses of these modes (after Ref. 5: 10.25 db/m, 15.82 db/m, and 22.38 db/m for the $EH_{11}$, $EH_{21}$, and $EH_{31}$ modes, respectively) thus reducing the signal-to-noise ratio in these cases. Measured intensity and polarization for coupling the high order modes at the waveguide's inlet and outlet ports. The first to forth columns depict the intensity (dashed line indicates the waveguide's inner circumference), intensity after a polarizer (arrows indicate polarizer orientation), measured polarization orientation, and intensity cross-section (dots-measured, solid line-predicted), respectively.

For many applications, manipulation of the fiber mode at the waveguide outlet is desired. An example is the transformation of a waveguide mode to a uniformly polarized free space beam so as to achieve high focusability, or to a radially polarized vectorial vortex for efficient metal cutting. The required polarization manipulation can be obtained by inverting our coupling mechanism, as depicted in FIG. 1. In this case, the 1" focal length lenses L2 and L3, serve as a 4-f system with PBOE2 placed in an intermediate focal plane. The PBOE modifies the polarization of the hollow waveguide mode to any desired polarization.

Figure 6:
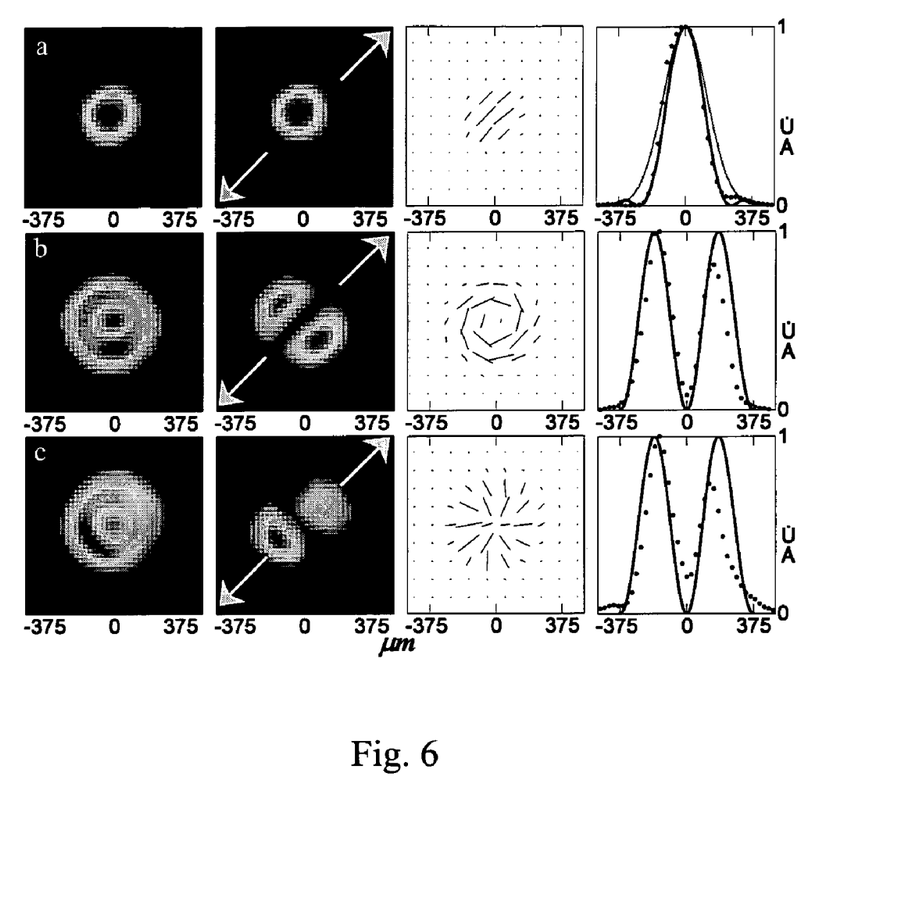
FIG. 6 shows measured intensity and polarization for the inverse coupling and transformation of the $TE_{01}$ mode to: (*a*) a linearly polarized beam by use of PBOE with n=0, (*b*) a radially polarized beam by use of PBOE with n=1, (*c*) Azimuthally polarized beam obtained without a second PBOE.

Transforming the azimuthal polarization of the $TE_{01}$ mode to a linear polarization can be obtained by a PBOE with n=0. This arises from a general property of π-retardation PBOEs, namely that $T^2=-I$ where T is the PBOE transmission matrix and I is the unit matrix. FIG. 6(a) shows, in the usual manner, the measured results at the focus of the L3 lens. The absence of a distinctive doughnut intensity pattern results from the polarization manipulations of PBOE2. The focusability factor of the intensity spot was measured to be $M^2=1.7$. This is a considerable improvement over the $M^2=2.2$ of the $TE_{01}$ mode. Furthermore, by removing the intensity side lobes, seen in the intensity cross-section, we can achieve a focusability of $M^2=1.1$ with a mere 11% intensity loss. Thus, the ability to obtain a diffraction-limited spot by using PBOEs is demonstrated. In FIG. 6 measured intensity and polarization for the inverse coupling and transformation of the $TE_{01}$ mode to: (a) a linearly polarized beam by use of PBOE with n=0 (red line shows the focus of a Gaussian beam having a similar width.), (b) a radially polarized beam by use of PBOE with n=1. (c) Azimuthally polarized beam obtained without a second PBOE. The first to fourth columns depicts the intensity, intensity after a polarizer (arrows indicate polarizer orientation), measured polarization orientation, and intensity cross-section (dots-measured, solid line-predicted), respectively.

For comparison, FIG. 6(b) shows the intensity without a PBOE inserted in the intermediate focal plane of the L2 and L3 lenses. Note the larger focal spot of the azimuthal linearly polarized vectorial vortex with respect to the linearly polarized focus of FIG. 6(a). FIG. 6(c) demonstrates transformation of the $TE_{01}$ waveguide mode to a radially polarized vectorial vortex by using a PBOE with n=1 as PBOE2. The results indicate that the desired radially polarized vectorial vortex was achieved. We therefore demonstrate the ability of a PBOE (together with lenses) to efficiently couple a waveguide mode to a desired free-space mode.

We have proposed PBOEs as an efficient means of obtaining the space-variant polarization state of a waveguide mode, thereby enabling its efficient coupling to high order waveguide modes. We have experimentally demonstrated the coupling of linearly polarized light at a wavelength of 10.6 μm to single vectorial modes of various orders within a hollow metallic waveguide by use of PBOEs. In addition, we demonstrated inverse transformation of the fundamental low order $TE_{01}$ mode to linearly and radially polarized free space modes. In a similar manner, any waveguide vectorial mode can be excited by a properly designed PBOE.

Throughout the present specification the term "waveguide", although the above account referred to hollow waveguides, includes (without limiting the scope of the invention), for example, optical fiber, single-mode or multi-mode, filled core (filled=material other than air, vacuum), hollow fiber, photonic band gap fiber.

Optical elements suitable for a system according to the poresent invention are typically PBOE but not limited to these elements. Generally, the first optical element comprises a mode-shaping optical element aimed at shaping the incoming spatially coherent light beam to a desired mode of the fiber, whereas the second optical element comprises a mode-shaping optical element for shaping the exiting light beam to desired vectorial field. In fact we refer to inhomogeneous anisotripic polarization optical elements of which PBOEs are inhomogeneous anisotripic subwavelength optical elements.

All measures, values and parameters hereinabove are given as examples for explanatory purposes and in no way limit the scope of the present invention.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A wave-guiding system for mode-selective transmission of a spatially coherent light beam, the system comprising:
   a wave-guide with an inlet and an outlet for transmitting one or more modes;
   a first mode-shaping optical element comprising a Pancharatnam-Berry Optical Element (PBOE) for shaping the spatially coherent light beam before it enters through the inlet of the wave-guide to a desired mode of the wave-guide; and
   a second mode-shaping optical element for shaping light beam after it exits from the outlet of the wave-guide for obtaining a desired vectorial field.

2. The system as claimed in claim 1, wherein the wave-guide comprises an optical fiber.

3. The system as claimed in claim 2, wherein the optical fiber comprises a hollow fiber.

4. The system as claimed in claim 2, wherein the optical fiber comprises a photonic band gap fiber.

5. The system as claimed in claim 4, wherein the photonic band gap fiber comprises a circular hollow Bragg wave-guide.

6. The system as claimed in claim 1, wherein the second mode-shaping optical element comprises a PBOE.

7. The system as claimed in claim 1, wherein the first and second mode- shaping optical elements comprise each a PBOE.

8. The system as claimed in claim 1, further comprising additional optical elements placed on an optical path of the system.

9. The system as claimed in claim 8, wherein the additional optical elements comprise lenses.

10. The system as claimed in claim 1, further comprising a spatially coherent light source for generating the spatially coherent light beam.

11. The system as claimed in claim 1, wherein first mode-shaping optical element comprises an optical element that causes the light beam to be a light beam with azimuthal polarization state.

12. A method for mode-selective transmission of a spatially coherent light beam, the method comprising:
    mode-shaping the spatially coherent light beam to a desired mode of a wave-guide using a Pancharatnam-Berry Optical Element (PBOE);
    passing the light-beam with the desired mode through the wave-guide; and
    mode-shaping the light beam after it exits from the wave-guide for obtaining a desired vectorial field.

13. The method as claimed in claim 12, wherein the step of mode-shaping the light beam after it exits from the wave-guide comprises passing the light beam through a PBOE.

14. The method as claimed in claim 12, wherein the step of mode-shaping the spatially coherent light beam to a desired mode of a wave-guide comprises polarizing the beam to an azimuthal polarization state.

15. The method as claimed in claim 12, wherein the step of mode-shaping the light beam after it exits from the wave-guide comprises polarizing the beam to a linear polarization state.

16. The method as claimed in claim 12, wherein the step of mode-shaping the light beam after it exits from the wave-guide comprises polarizing the beam to a radial polarization state.

* * * * *